(12) United States Patent
Anglin (10) Patent No.: US 10,212,998 B2
(45) Date of Patent: Feb. 26, 2019

(54) EDUCATIONAL SAVING SYSTEM

(71) Applicant: Jonathan G. Anglin, Columbus, OH (US)

(72) Inventor: Jonathan G. Anglin, Columbus, OH (US)

(*) Notice: Subject to any disclaimer, the term of this patent is extended or adjusted under 35 U.S.C. 154(b) by 97 days.

(21) Appl. No.: 15/245,613

(22) Filed: Aug. 24, 2016

(65) Prior Publication Data

US 2018/0061267 A1 Mar. 1, 2018

(51) Int. Cl.
| | |
|---|---|
| *A45C 1/12* | (2006.01) |
| *A63H 3/00* | (2006.01) |
| *A63H 33/00* | (2006.01) |
| *G07D 3/00* | (2006.01) |
| *G09B 19/18* | (2006.01) |
| *A63H 33/30* | (2006.01) |

(52) U.S. Cl.
CPC .......... *A45C 1/12* (2013.01); *A63H 3/005* (2013.01); *A63H 33/00* (2013.01); *G07D 3/00* (2013.01); *A63H 33/3005* (2013.01); *G09B 19/18* (2013.01)

(58) Field of Classification Search
CPC . A45C 1/12; G07D 3/00; A63H 3/005; A63H 33/00; A63H 33/3005; G09B 19/18
USPC ........................................................ 434/107
See application file for complete search history.

(56) References Cited

U.S. PATENT DOCUMENTS

| | | | | |
|---|---|---|---|---|
| 3,992,805 | A * | 11/1976 | Arkin | A45C 1/12 446/8 |
| 5,520,286 | A * | 5/1996 | Murakoshi | G07G 1/0027 206/0.84 |
| 5,716,211 | A | 2/1998 | Vetter | |
| 6,109,996 | A * | 8/2000 | Ma | A45C 1/12 446/8 |
| 6,454,570 | B1 | 9/2002 | Woods | |
| 6,976,619 | B2 | 12/2005 | Beacham | |
| 7,383,980 | B1 * | 6/2008 | Beacham | A45C 1/12 109/53 |
| 7,500,595 | B1 | 3/2009 | Beacham | |
| 8,473,380 | B2 * | 6/2013 | Thomas | G06Q 20/10 705/35 |
| 8,628,371 | B2 | 1/2014 | D'Alleva | |
| 8,733,627 | B2 | 5/2014 | Abedelal | |
| 9,033,758 | B2 | 5/2015 | Burns | |
| 9,501,940 | B2 * | 11/2016 | Moumneh | G09B 5/00 |
| 9,767,711 | B2 * | 9/2017 | Moumneh | G09B 19/18 |
| 2004/0067469 | A1 * | 4/2004 | Rogan | A63F 13/12 434/107 |
| 2005/0045709 | A1 * | 3/2005 | Beacham | A45C 1/12 232/10 |
| 2005/0069841 | A1 | 3/2005 | Lee | |
| 2009/0149106 | A1 * | 6/2009 | D'Alleva | A45C 1/12 446/8 |
| 2011/0003525 | A1 | 1/2011 | Weatherly | |
| 2011/0290870 | A1 * | 12/2011 | Ramsaroop | A45C 1/12 232/5 |
| 2012/0244776 | A1 * | 9/2012 | Burns | A45C 1/12 446/8 |

(Continued)

*Primary Examiner* — Jack Yip (57) ABSTRACT

A system for educating children about the benefits of saving money. The system encourages children to save using a toy bank having a chamber for savings that is only accessible at the issuing financial institution. The system also provides educational tools and aid featuring the toy bank as a fictitious character teaching the children the value of saving money.

1 Claim, 7 Drawing Sheets

(56) References Cited

U.S. PATENT DOCUMENTS

2013/0248588 A1\* 9/2013 Abedelal ................. A45C 1/12
232/4 R

\* cited by examiner

EDUCATIONAL SAVING SYSTEM

CROSS-REFERENCE TO RELATED APPLICATION

This application is a nonprovisional application and claims no benefit of right of priority.

TECHNICAL FIELD

Exemplary embodiments of the present invention relate to an educational bank for children. More particularly, exemplary embodiments of the present invention relate to an educational bank to encourage children to budget and save money, and to familiarize these children with the procedures of financial institutions.

BACKGROUND OF THE ART

More than half of the households in the United States currently have less than one month of income available in accessible savings to use in case of an emergency. Many financial advisors recommend that families should have three to six month's income in readily accessible savings. Regardless of the exact standard, it is clear that most Americans lack sufficient savings. One avenue to encourage more savings in the United States is to educate children regarding the importance of saving.

Over the years several products have attempted to encourage children to save the money they receive (e.g., "piggy bank"), but it is obvious, given the state of savings in the United States, that those methods of education have failed. While prior toy banks or other savings devices have appealed esthetically to children, such designs have failed to instill the importance of savings in children. Furthermore, there has not been any accompanying instruction or education on the importance of savings to encourage a level of responsibility in the children.

Additionally, there seems to be very little financial institution involvement with the products currently designed for children. This lack of involvement almost ensures that the first interaction children have with banks or other financial institutions will not occur until they are adults. The current offerings to children also fail to provide incentives for the children to begin saving.

Accordingly, there is a need for a bank and system directed to children to encourage children to save money in an educational and fun way, while providing incentives rewarding the children for saving.

SUMMARY OF THE INVENTIVE CONCEPT

The inventive method was developed to establish beneficial financial habits in children. Currently there is a lack of effort on the part of financial institutions and education at large to begin responsible finance management from an early age. This inventive method recognizes that interactions with a financial institution at a young age are difficult and the inventive method endeavors to make this interaction more enjoyable for the child.

To accomplish this, the method provides an individual toy bank be issued to a child. The toy bank includes a number of chambers that correspond to different aspects of responsible financial management, including spending, charity, and savings. The toy bank consists of a base portion and an interchangeable top portion. The interchangeable top portion may have the appearance of a car, boat, plane, or other form resembling a toy. This allows the child to have a level of familiarity and comfort with the toy bank.

To encourage savings and to provide for positive interaction between the financial institution and the child, the savings chamber in the toy bank will be locked preventing the money from being removed. To establish positive interactions with the financial institution, the key to the lock on the savings chamber will be kept at the financial institution. Accordingly, the child will have to visit the financial institution in order to access the money kept in the savings chamber.

To further reinforce this positive financial behavior the method also incorporates educational material in a form pleasing to children, such as comics or other similar material. These materials include a representation of the toy bank in their possession. In this way the child can make a connection between the toy bank and the stories encouraging good financial practices in the provided material.

To further encourage these good financial habits, the money the child saves may be tracked. The method may include savings thresholds, where upon achieving the child may be presented with awards, this providing positive feedback to the child. The awards may take a variety of form, such as new interchangeable top portions for the toy bank, decorations for the toy bank, or other similar decorative or ornamental awards. In this way the child may be able to customize their toy bank through reaching saving goals.

BRIEF DESCRIPTION OF THE DRAWINGS

The advantages and other characteristics of the disclosed embodiments will be better understood when attention is directed to the accompanying drawings, wherein identical elements are identified with identical reference numerals and wherein.

DETAILED DESCRIPTION OF THE EXEMPLARY EMBODIMENT(S)

Exemplary embodiments of the present invention will now be described in greater detail. It should be recognized that the present invention can be practiced in a wide range of other embodiments besides those explicitly described, and the scope of the exemplary embodiments described are expressly not limited.

As shown in the Figures, the present invention provides a bank 5 designed to appeal to children. The bank 5 includes an interchangeable top portion 10 and a base portion 15. The base 15 may be constructed from wood, plastic, or other suitable structural material that would pose no health hazard to the child and is sufficient to support the top portion 10. The purpose of the base 15 is to provide a platform to attach the interchangeable top portions 10.

Figure 1:
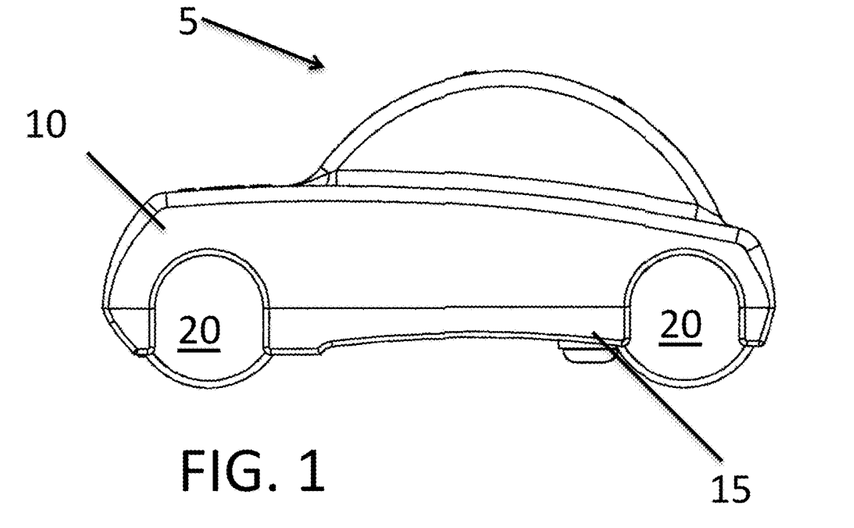
FIG. 1 is a side view of an exemplary embodiment of the inventive bank in accordance with the inventive concept.

Now directing attention to FIG. 1 a bank 5 is illustrated. The bank 5 is shown having a top portion 10 in the style of a car, although other styles may be provided (See FIGS. 7, 8, and 9). The top portion 10 may have areas on which a child may place stickers to decorate and customize the bank 5. For example the stickers could depict a wind glass, doors, hood, bumpers, or stickers depicting the name of the associated bank or financial institution. A collection of stickers may be provided to the child or the child may purchase stickers to customize the bank 5.

The bank 5 also includes a base 15 and a top portion 10. The top portion 10 sits atop and is attached to the base 15 so as to be supported. The base 15 is designed to be affixed to the top portion 10 with portions of each interlocking to form the bank 5. The exposed portion of the base 15 includes wheels 20 designed to finish out the motif of the car present in the top portion 10. Plugs 30 are disposed within the base 15 to retain currency in chambers 100, 102, 104 (shown in FIG. 6).

Figure 2:
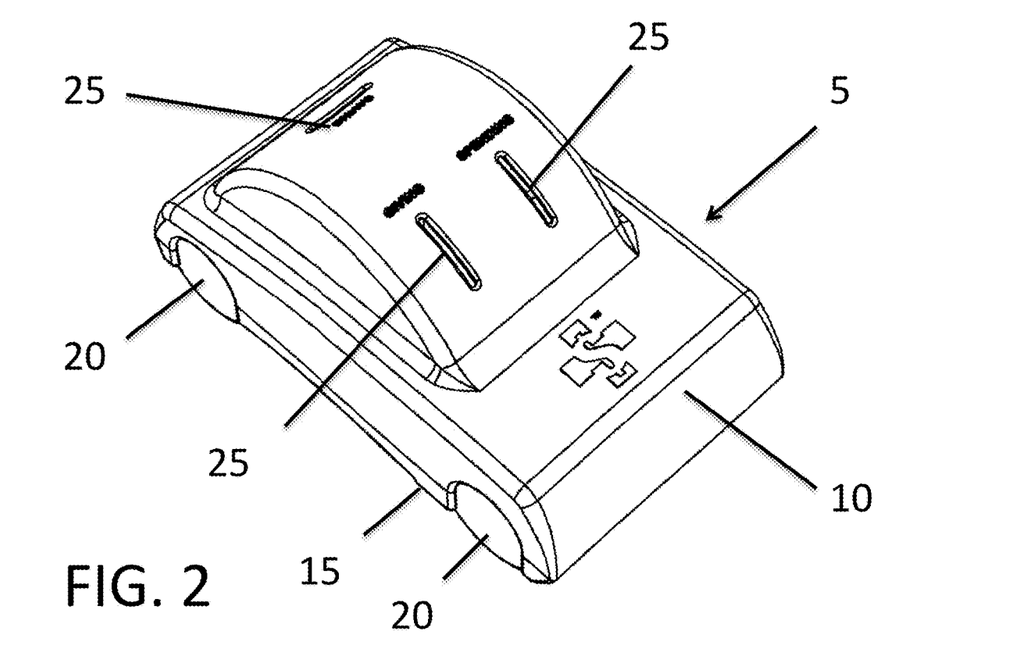
FIG. 2 is a top perspective view of an exemplary embodiment of the inventive bank in accordance with the inventive concept.
Figure 6:
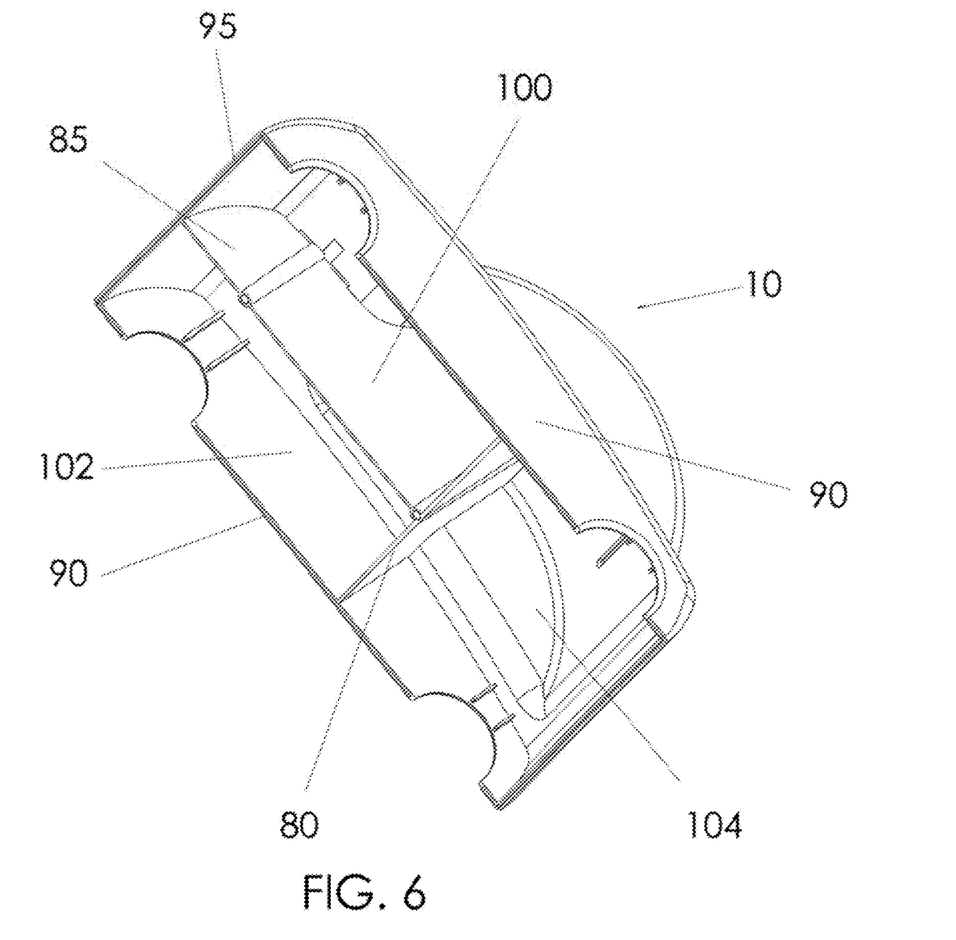
FIG. 6 is a bottom perspective view of an exemplary embodiment of the interior of the interchangeable top portion of the bank according to the inventive concept.

Turning attention to FIG. 2 a top perspective view of the bank 5 is provided. The top portion includes slots 25 for receipt of coins and/or bills. The slots 25 are coupled to (e.g., positioned over) chambers 100, 102, 104, within the bank 5 as illustrated in FIG. 6. When the coin or bill is inserted into one of the slots 25, it will drop into a coupled chamber 100, 102, 104 and accumulate there. To effectuate the educational purpose of the bank 5 the slots 25 are labeled with the phrases "SAVINGS," "GIVING," and "SPENDING." Having each slot 25 and corresponding chamber 100, 102, 104 labeled allows the child to allocate any money they have between the various groups and encourages both saving and charity.

Figures 3, 4:
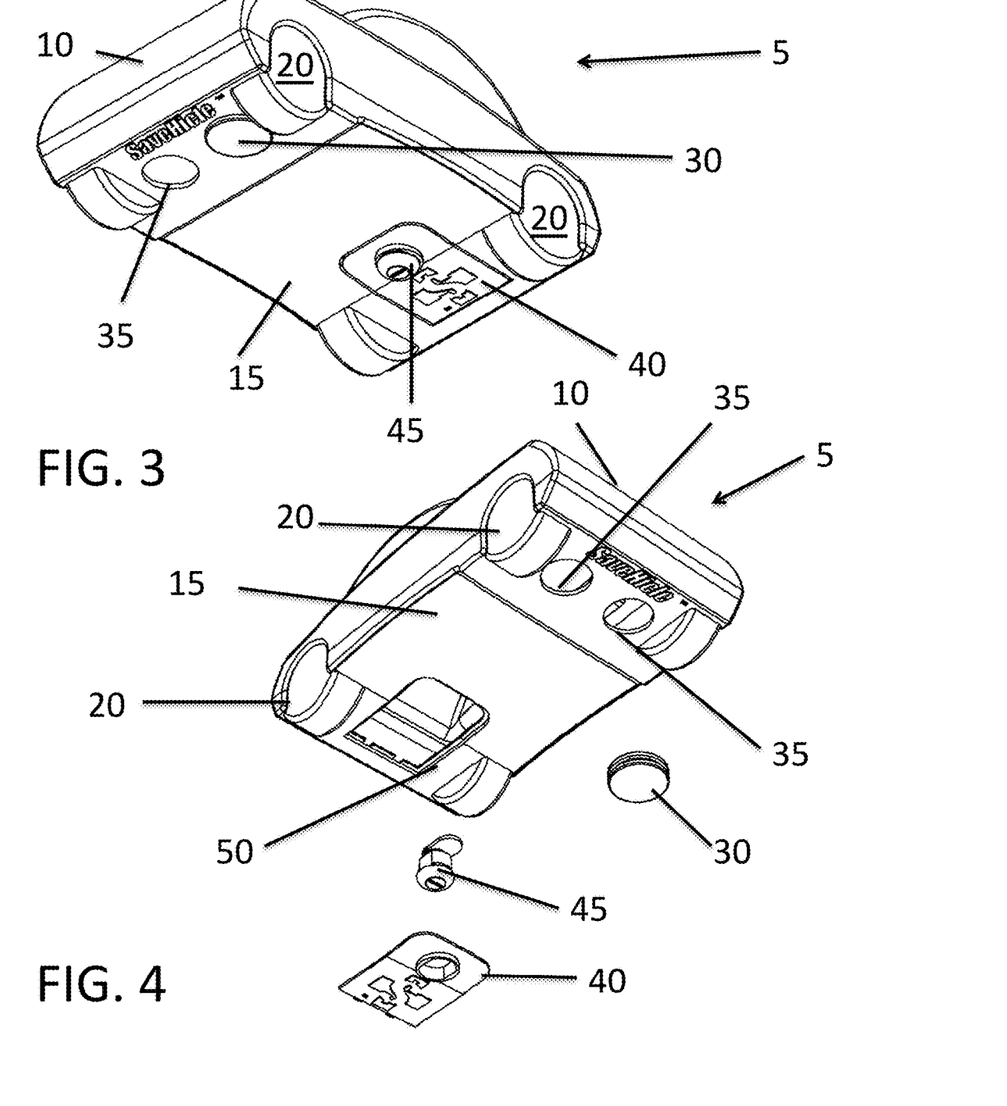
FIG. 3 is a bottom perspective view of an exemplary embodiment of the inventive bank in accordance with the inventive concept.
FIG. 4 is a partial exploded view of an exemplary embodiment of the inventive bank in accordance with the inventive concept.

FIGS. 3 and 4 show the inventive bank 5, illustrating how the chambers 100, 102, 104 are accessed to remove the currency contained therein. As provided, the top portion 10 is affixed to the base 15. At least two openings 35 are defined by the base 15 and relate to two of the chambers 100, 102 created by the top portion 10 and the base 15. The openings 35 are sufficiently sized to allow both bills and coins to be easily removed from the chambers 100, 102. Furthermore, the openings 35 correspond to the chambers 100, 102 labeled "GIVING" and "SPENDING" respectively, this feature is important to the educational purpose of this bank 5 and the system. To prevent the bills and coins from falling out of the corresponding chambers 100, 102, plugs 30 are provided and retained in the openings 35. Although the openings 35 are shown as circular the shape of the openings 35 could be any shape sufficient to allow the removal of the currency.

On the opposite end of the base 15, a door 40 is provided for retrieving the currency from the chamber 104 labeled "SAVINGS." To prevent access to the saving chamber 104 the door 40 includes a lock 45. The door 40 fits into the access port 50 found in chamber 104.

Figure 5:
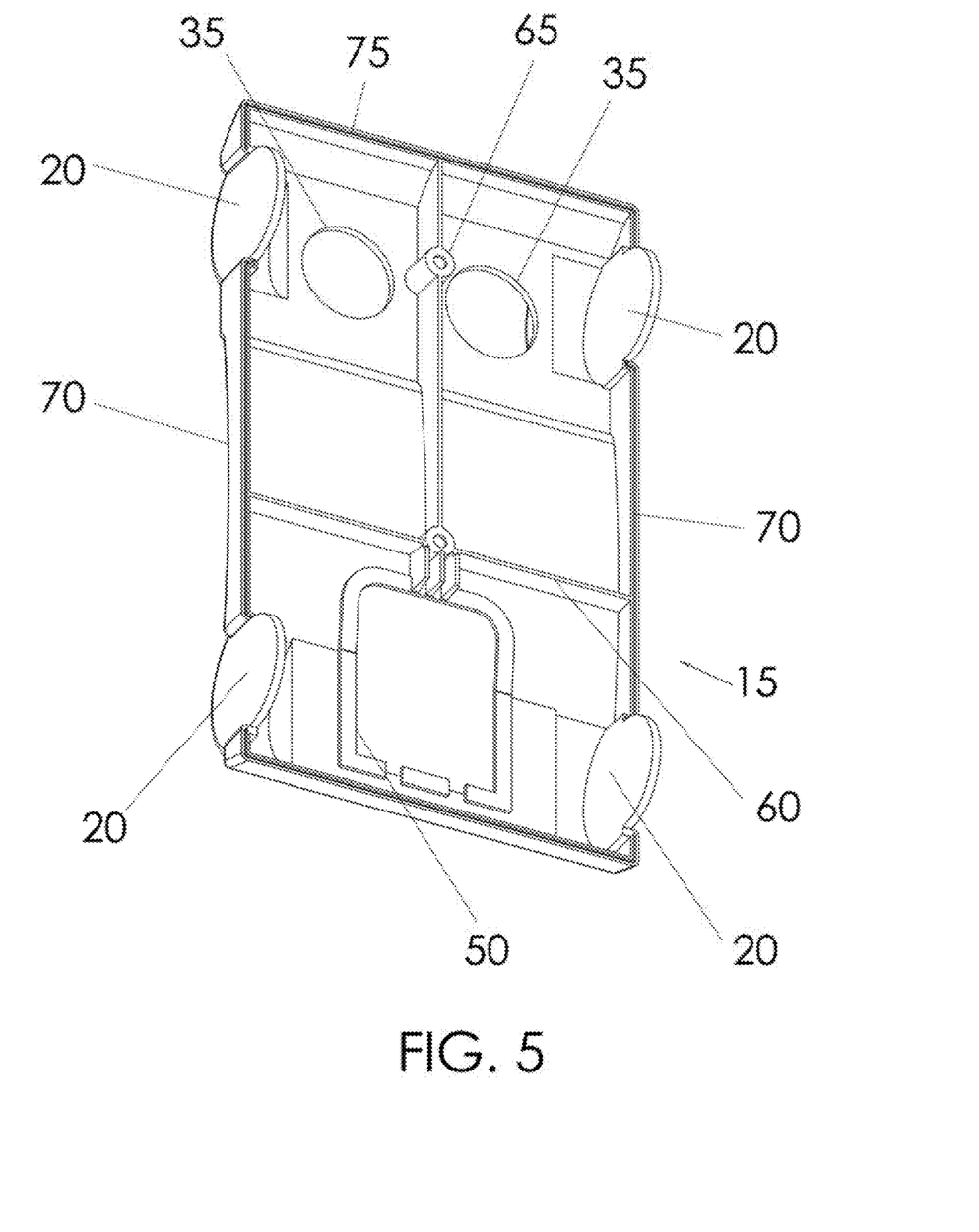
FIG. 5 is an inside bottom view of an exemplary embodiment of the inventive bank in accordance with the inventive concept.

The interior of the base 15 is illustrated in FIG. 5. The openings 35 and the access port 50 are easily visible and provide for the removal of the currency retained in the bank 5. The interior of the base 15 also includes first and second partitions 60, 65. The first partition 60 runs between the side edges 70 of the base 15. The second partition 65 runs from a front edge 75 of the base 15 and terminates at the first partition 60 creating three separate sections in the interior of the base 15.

The interior of the top portion 10 also includes partitions 80, 85. A third partition 80 runs between the side edges 90 of the top portion 10. The fourth partition 85 begins at the front edge 95 of the top portion 10 and terminates at the third partition 80. Once the top portion 10 and the base 15 are affixed to one another the first partition 60 and the third partition 80 come into complimentary engagement with each other, and at the same time the second partition 65 comes into complimentary engagement with the fourth partition 85. Once the partitions 60, 65, 80, 85 are in complimentary engagement, the partitions 60, 65, 80, 85 and the top portion 10 and the base 15 define three distinct chambers 100, 102, 104.

The inventive bank 5 as described herein is used as a part of a system used to teach children to be responsible with their money. In this system, a financial institution may provide the bank 5 to a child. Once the child is issued the bank 5 the child may take possession of the bank 5; however, the financial institution retains the key to the lock 45. The educational system also provides instructional material to the child in the form of comics, storybook, or pamphlets about the bank 5. In this manner, the child has an entertaining and educational aid featuring the bank 5 as a fictitious character named "SAVEHICLE."

Figure 7:
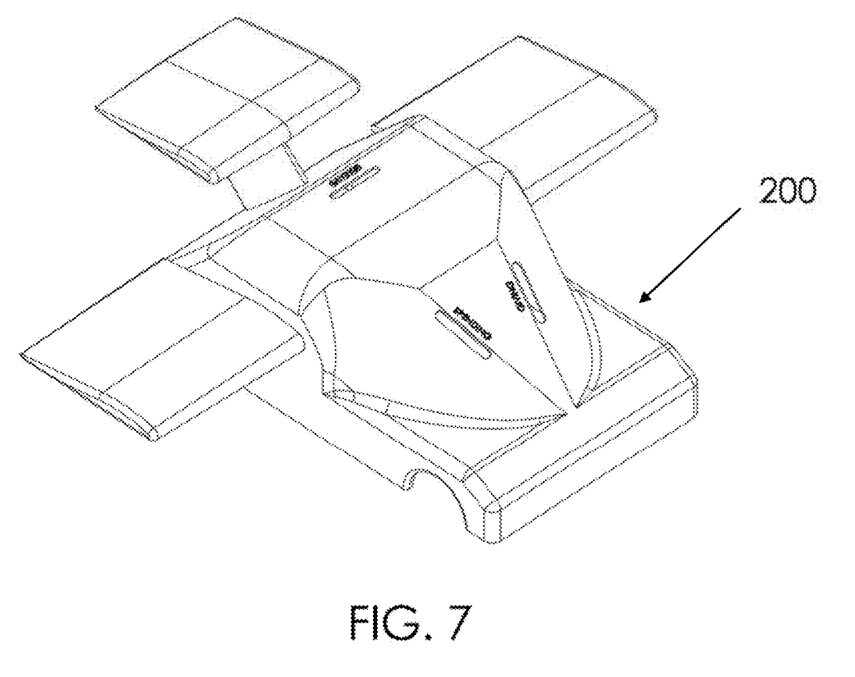
FIG. 7 is a top perspective view of an exemplary embodiment of another interchangeable top portion of the bank according to the inventive concept.
Figure 8:
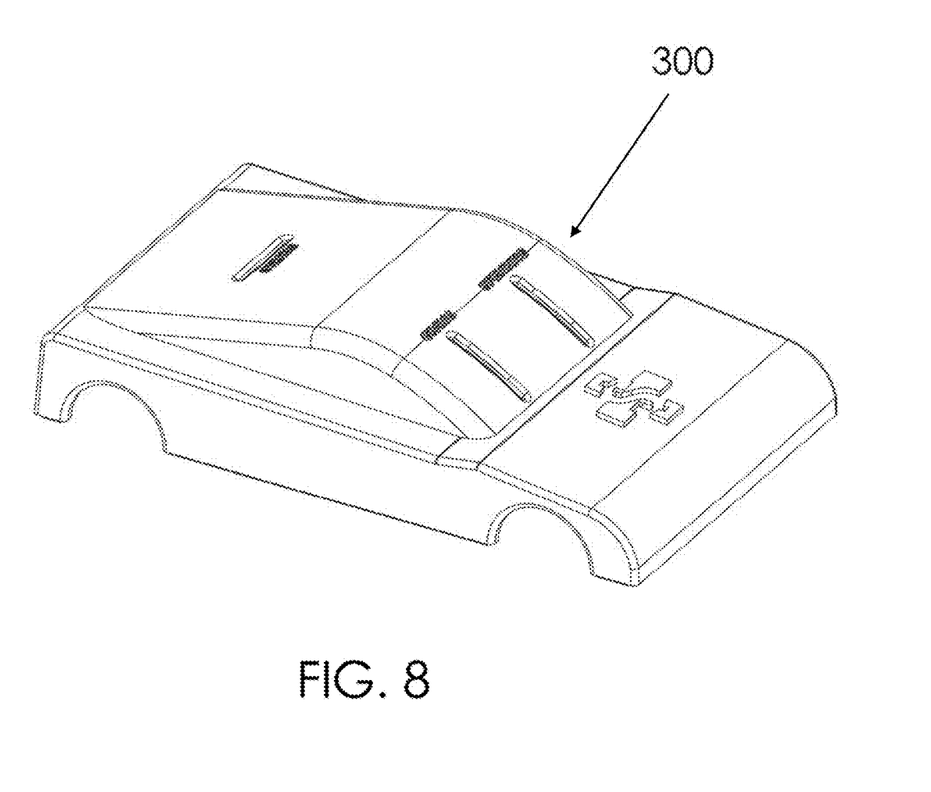
FIG. 8 is a top perspective view of an exemplary embodiment of another interchangeable top portion of the bank according to the inventive concept.
Figure 9:
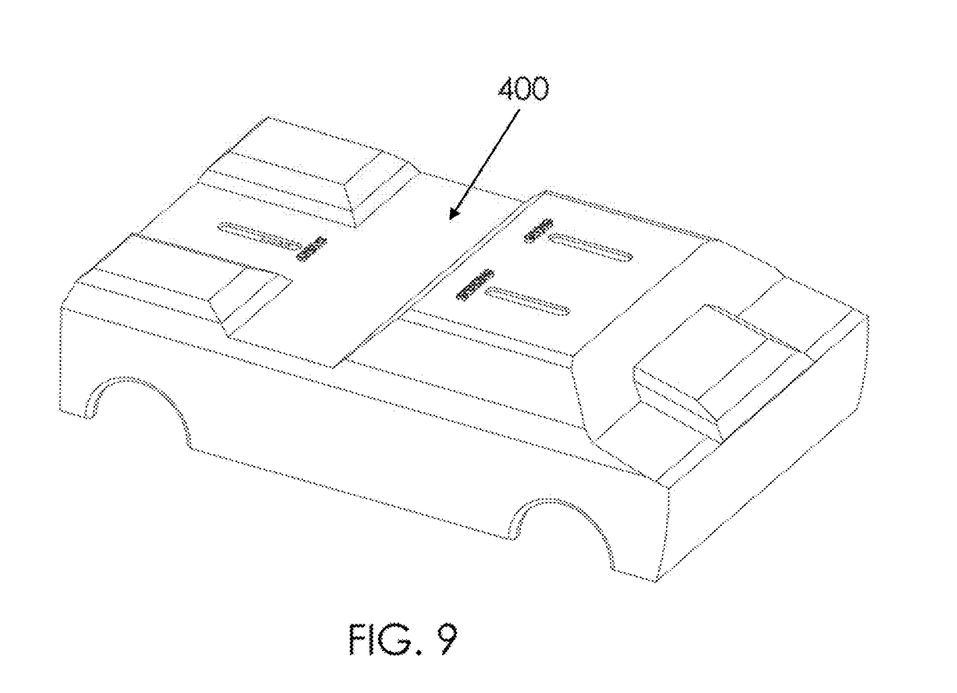
FIG. 9 is a top perspective view of another exemplary embodiment of another interchangeable top portion of the bank according to the inventive concept.

Once the bank 5 is in the child's possession, the child then can allocate their money between the various chambers 100, 102, 104 in the bank 5. The plugs 30 in the bank 5 allow the child to remove the money from the chambers 100, 102 labeled "SPENDING" and "GIVING." However, to remove the money placed in the chamber 104 labeled "SAVINGS" the child will have to take the bank 5 back to the financial institution that has retained the key. The financial institution may track the saving progress of the child and provide awards to the child based on the level of savings. The awards might include stickers to individualize the bank 5. In addition, once significant savings milestones are achieved by the child, the financial institution may allow the child to exchange the top portion 10 for another top portion 10 that represents a different type of vehicle, such as boat, airplane, race car, etc. In this manner, the educational system awards the child for continued savings. As illustrated in FIGS. 7, 8, and 9, the toy bank 5 may have awards such as interchangeable plane top portion 200, interchangeable sports car top portion 300, and interchangeable truck top portion 400. These additional top portions 200, 300, 400 have the same internal features as the top portion 10 described herein.

While the embodiments disclosed described the best modes known to the inventor at the time of filing, the scope of the invention is not to be limited to only the embodiments disclosed herein.

What is claimed is:

1. A method of educating a child about the importance of saving money, comprising:
    issuing an individual toy bank to a child, said toy bank including:
        a base, said base having a first opening and a second opening defined by said base, said first and second openings positioned at front edge of the base;

plugs for retention within said first and second openings, said plugs being able to be removed by said child;
a first partition located in the base, said first partition running between opposing side edges of the base;
a second partition located in the base, said second partition beginning at the front edge of the base and terminating at said first partition;
an access port positioned at the rear edge of the base;
an interchangeable top portion having a third and a fourth partition therein, said third partition running between opposing side edges of said top portion and said fourth partition beginning at a front edge of said top portion and terminating at said third partition; wherein when said top portion is removably fixed to said base the first partition and the third partition are brought into communication and the second and fourth partitions are brought into communication creating first, second, and third chambers within said toy bank;
a first slot in said top portion positioned to drop currency into said first chamber;
a second slot in said top portion positioned to drop currency into said second chamber;
a third slot in said top portion positioned to drop currency into said third chamber;
an access panel retained within said access port in said base;
a lock located in said access panel, said lock preventing access to the third chamber;
maintaining a key for said lock at an issuing financial institution;
providing educational material to the child to encourage saving, wherein said educational material includes a fictional representation of the toy bank;
monitoring the saving progress of the child; and
awarding the child based on predetermined thresholds of saving, wherein awards include stickers or additional interchangeable top portions.

* * * * *